United States Patent Office 2,746,871
Patented May 22, 1956

2,746,871
STABILIZATION OF ORGANIC COMPOUNDS

Ralph B. Thompson, Hinsdale, Ill., assignor to Universal Oil Products Company, Des Plaines, Ill., a corporation of Delaware No Drawing. Application February 13, 1953,
Serial No. 336,877

12 Claims. (Cl. 99—163)

This invention relates to the stabilization of organic compounds which tend to deteriorate in storage or in use due to oxidation or other reactions.

The novel method of the present invention may be utilized for the stabilization of various organic materials which are subject to oxidative deterioration and include motor fuel, particularly unsaturated gasolines as, for example, cracked gasoline and polymer gasoline, diesel oil, mineral oil, lubricating oil, fuel oil, drying oil, greases, rubber, monomers including styrene, butadiene, etc., paraffin waxes, edible fats and oils, etc. These materials are adversely affected by oxygen, with the resultant formation of undesirable gum, discoloration, rancidity or other deleterious reactions.

The invention is particularly applicable to the stabilization of fatty materials including edible fats and oils which may be of animal, vegetable or mineral origin and which tend to become rancid especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. as well as the hydrogenated oils. It is understood that other oils and fats may be treated within the scope of the present invention including oils and fats which have previously been subjected to various treatments, such as blowing with air, heat treatment, etc.

In one embodiment the present invention relates to a method of stabilizing an organic substance subject to oxidative deterioration which comprises adding thereto a hydroxyspirochroman.

In a specific embodiment the present invention relates to a method of stabilizing a fatty material which comprises adding thereto from about 0.0001% to about 1% by weight of a 6,7,6',7',tetrahydroxy-bis-2,2'-spirochroman.

Hydroxyspirochromans for use in accordance with the present invention are represented by the following general formula:

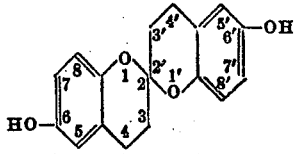

The hydroxyspirochromans may be prepared in any suitable manner and the specific hydroxyspirochroman produced will depend upon the specific reactants utilized in its preparation. In one method, hydroquinone may be condensed with acetone and the resultant hydroxyspirochroman will comprise 6,6'-dihydroxy-4,4,4',4'-tetramethyl-bis-2,2'-spirochroman. In general the yields obtained when using hydroquinone as a starting material are not too satisfactory and, therefore, it is preferred to utilize hydroxyhydroquinone as the starting material. Thus the condensation of hydroxyhydroquinone with acetone will produce 6,7,6',7'-tetrahydroxy-4,4,4',4'-tetramethyl-2,2'-spirochroman. It will be noted that when hydroxyhydroquinone is utilized, the hydroxyspirochroman will contain hydroxy groups in the 6,7 and 6',7' positions.

In preparing the hydroxyspirochroman, it is understood that various derivatives of hydroquinone and hydroxyhydroquinone may be utilized. The hydroquinone or hydroxyhydroquinone may contain one or more substituents attached to the ring provided that a position ortho to the hydroxyl group is not substituted. The substituent preferably is a hydrocarbon group such as alkyl, aryl, alkaryl, aralkyl, cycloalkyl, etc. In other cases the substituent group may comprise oxygen, nitrogen and/or sulfur including, for example, alkoxy groups, amino groups, thia groups, etc. For ease in preparation, it sometimes is desirable to use the acetate or other derivatives of hydroquinone or hydroxyhydroquinone. The acetyl groups split off during the method of preparation and the resultant products are the same as when the starting materials contain free hydroxyl groups. For example, hydroxyspirochromans have been prepared by the condensation of hydroxyhydroquinone triacetate with acetone, methylethylketone, cyclohexanone, etc.

Any suitable ketone may be employed, including saturated and unsaturated, aliphatic and cyclic ketones. Acetone is a preferred saturated aliphatic ketone for use in accordance with the present invention. Other ketones include methylethylketone, methylpropylketone, methylbutylketone, methylamylketone, diethylketone, ethylpropylketone, ethylbutylketone, ethylamylketone, dipropylketone, propylbutylketone, propylamylketone, dibutylketone, etc. When desired, higher boiling ketones may be employed, including butylamylketone, diamylketone, amylhexylketone, amylheptylketone, dihexylketone, diheptylketone, etc.

Of the unsaturated aliphatic ketones, phorone is particularly preferred and, in fact, it has been found that the products formed by the condensation of phorone and hydroxyhydroquinone are substantially the same as those produced from acetone and the same polyhydroxy benzene. Other unsaturated ketones which may be used include mesityl oxide, methylheptenone, etc., but not necessarily with equivalent results.

Saturated cyclic ketones include cyclopentanone, cyclohexanone, cycloheptanone, 3-methyl-cyclohexanone, 4-methyl-cyclohexanone, etc., while unsaturated ketones include pulegone, carvone, etc.

A particular advantage to the use of hydroxyhydroquinone is the fact that it may be condensed with higher molecular weight ketones including, for example, cyclohexanone, methylamylketone, etc., and the resulting hydroxyspirochroman is of greater solubility in many substrates and particularly hydrocarbons. This increased solubility permits more ready use of the inhibitor and eliminates the need for a solvent.

It is understood that the various hydroxyspirochromans which may be prepared and utilized in accordance with the present invention are not necessarily equivalent. Furthermore, the hydroxyspirochroman compounds may be of different effectiveness in different substrates. In any event, all of the hydroxyspirochromans of the present invention will serve to retard oxidative deterioration of organic materials.

The condensation of hydroquinone or hydroxyhydroquinone or their acetates and a ketone may be effected in any suitable manner which, in general, will comprise mixing hydroquinone or hydroxyhydroquinone and a ketone with acetic acid and concentrated hydrochloric acid, followed by heating for a sufficient time to effect the reaction, after which the products may be cooled, filtered, washed to remove unreacted compounds, and then dried and purified by recrystallization.

As hereinbefore set forth the hydroxyspirochromans of the present invention may be prepared in any suitable manner. In another method, hydroxyspirochromans may be formed by the reaction of acetone, o-alkylhydroquinones with a free ortho position, and sulfuric acid at 25° C.

The inhibitor of the present invention is generally added to the organic material in amounts of less than 1% by weight and preferably in an amount of from about 0.0001% to about 1% by weight. When used in edible fats and oils the inhibitor will generally be employed in amounts of from about 0.001% to about 0.5% by weight and when used in gasoline the inhibitor will generally be used in amounts above about 0.02% by weight. The inhibitor may be used alone or in conjunction with synergists, inhibitor activators, dyes, antiknock agents, etc., depending upon the material to be stabilized. For example, when used in edible fats and oils, a synergist such as phosphoric acid, ascorbic acid, etc. will generally be used along with the inhibitor, the synergist usually being added in amounts within the range of from about 0.0001% to about 0.5%. When used in gasoline, lead tetraethyl, a dye and perhaps an inhibitor activator, such as certain types of alkylene polyamines, may be used.

The following examples are introduced to illustrate further the novelty and utility of the present invention, but not with the intention of unduly limiting the same.

EXAMPLE I

A number of hydroxspirochroman compounds were prepared by the condensation of hydroxyhydroquinone triacetate with acetone, methylethylketone, cyclohexanone, methyl n-amylketone and diethylketone. The condensation of hydroxyhydroquinone triacetate with acetone was effected as follows: Hydroxyhydroquinone triacetate (77 g.), acetone (31 g.), glacial acetic acid (92 cc.) and concentrated hydrochloric acid (70 cc.) were mixed, heated sufficiently to obtain a homogeneous solution, and allowed to stand at room temperature for two days. The product was filtered and washed with water. After drying, the product was crystallized from acetone containing a small amount of acetic acid and sodium bisulfite by diluting with hot water and allowing to cool slowly. The condensation of hydroxyhydroquinone triacetate with the other ketones was effected in substantially the same manner.

The various hydroxyspirochroman compounds prepared in the above manner were utilized in a concentration of 0.005% by weight for the stabilization of lard which, without inhibitor, had a stability period of 6 hours as determined by the "Swift" test, hereinafter also referred to as the A. O. M. (Active Oxygen Method). The test is described in detail in the article by A. E. King, H. L. Roschen and W. H. Irwin, which appeared in the Oil and Soap, vol. X, No. 6, pages 106–109 (1933), and modified as described in the article by R. W. Reimenschneider, J. Turer and R. M. Spec, which appeared in the Oil and Soap, pages 169–171, September 1943. In general, this test comprises bubbling air through a sample of the lard until rancidity is determined organoleptically and by peroxide values. The results of these tests are reported as A. O. M. stability time which is the number of hours required to reach a peroxide number of 20. In addition, results are included in the following table on runs made when using both the hydroxyspirochroman compounds and 0.01% by weight of phosphoric acid as a synergist.

It is believed that the structures of the hydroxyspirochroman compounds are as shown in the following examples, but it is understood that the present invention is not limited to the specific structures illustrated.

*Table 1*

| Run No. | Reactants | Hydroxyspirochroman Compound Name | Hydroxyspirochroman Compound Formula | M. P., °C. | A. O. M.[1] With Inhibitor | A. O. M.[1] With Inhibitor+Synergist |
|---|---|---|---|---|---|---|
| 1 | Hydroxyhydroquinone triacetate+acetone. | 6,7,6',7'-tetrahydroxy-4,4,4',4'-tetramethyl-bis-2,2'-spirochroman. | (structure) | 265–267 | 55 | 88 |
| 2 | Hydroxyhydroquinone triacetate+methylethylketone. | 6,7,6',7'-tetrahydroxy-3,4,4'-trimethyl-4,4'-diethyl-bis-2,2'-spirochroman. | (structure) | 214–215 | 45 | 65 |
| 3 | Hydroxyhydroquinone triacetate+cyclohexanone. | bis-(6,7-dihydroxy-3-trimethylene-4,4-pentamethylene-2-spirochroman). | (structure) | 292–294 | 47 | 68 |
| 4 | Hydroxyhydroquinone triacetate+methyl n-amyl-ketone. | 6,7,6',7'-tetrahydroxy-4,4'-dimethyl-4,4'-di-n-amyl-3-n-butyl-bis-2,2'-spirochroman. | (structure) | 204–205 | 46 | 69 |
| 5 | Hydroxyhydroquinone triacetate+diethyl ketone. | | (structure) | | 27 | 50 |

[1] Active oxygen method.

United States Patent Office 2,746,871
Patented May 22, 1956

2,746,871
STABILIZATION OF ORGANIC COMPOUNDS

Ralph B. Thompson, Hinsdale, Ill., assignor to Universal Oil Products Company, Des Plaines, Ill., a corporation of Delaware No Drawing. Application February 13, 1953,
Serial No. 336,877

12 Claims. (Cl. 99—163)

This invention relates to the stabilization of organic compounds which tend to deteriorate in storage or in use due to oxidation or other reactions.

The novel method of the present invention may be utilized for the stabilization of various organic materials which are subject to oxidative deterioration and include motor fuel, particularly unsaturated gasolines as, for example, cracked gasoline and polymer gasoline, diesel oil, mineral oil, lubricating oil, fuel oil, drying oil, greases, rubber, monomers including styrene, butadiene, etc., paraffin waxes, edible fats and oils, etc. These materials are adversely affected by oxygen, with the resultant formation of undesirable gum, discoloration, rancidity or other deleterious reactions.

The invention is particularly applicable to the stabilization of fatty materials including edible fats and oils which may be of animal, vegetable or mineral origin and which tend to become rancid especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. as well as the hydrogenated oils. It is understood that other oils and fats may be treated within the scope of the present invention including oils and fats which have previously been subjected to various treatments, such as blowing with air, heat treatment, etc.

In one embodiment the present invention relates to a method of stabilizing an organic substance subject to oxidative deterioration which comprises adding thereto a hydroxyspirochroman.

In a specific embodiment the present invention relates to a method of stabilizing a fatty material which comprises adding thereto from about 0.0001% to about 1% by weight of a 6,7,6',7',tetrahydroxy-bis-2,2'-spirochroman.

Hydroxyspirochromans for use in accordance with the present invention are represented by the following general formula:

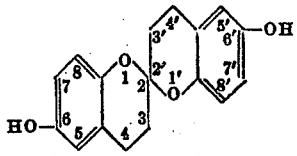

The hydroxyspirochromans may be prepared in any suitable manner and the specific hydroxyspirochroman produced will depend upon the specific reactants utilized in its preparation. In one method, hydroquinone may be condensed with acetone and the resultant hydroxyspirochroman will comprise 6,6'-dihydroxy-4,4,4',4'-tetramethyl-bis-2,2'-spirochroman. In general the yields obtained when using hydroquinone as a starting material are not too satisfactory and, therefore, it is preferred to utilize hydroxyhydroquinone as the starting material. Thus the condensation of hydroxyhydroquinone with acetone will produce 6,7,6',7'-tetrahydroxy-4,4,4',4'-tetramethyl-2,2'-spirochroman. It will be noted that when hydroxyhydroquinone is utilized, the hydroxyspirochroman will contain hydroxy groups in the 6,7 and 6',7' positions.

In preparing the hydroxyspirochroman, it is understood that various derivatives of hydroquinone and hydroxyhydroquinone may be utilized. The hydroquinone or hydroxyhydroquinone may contain one or more substituents attached to the ring provided that a position ortho to the hydroxyl group is not substituted. The substituent preferably is a hydrocarbon group such as alkyl, aryl, alkaryl, aralkyl, cycloalkyl, etc. In other cases the substituent group may comprise oxygen, nitrogen and/or sulfur including, for example, alkoxy groups, amino groups, thia groups, etc. For ease in preparation, it sometimes is desirable to use the acetate or other derivatives of hydroquinone or hydroxyhydroquinone. The acetyl groups split off during the method of preparation and the resultant products are the same as when the starting materials contain free hydroxyl groups. For example, hydroxyspirochromans have been prepared by the condensation of hydroxyhydroquinone triacetate with acetone, methylethylketone, cyclohexanone, etc.

Any suitable ketone may be employed, including saturated and unsaturated, aliphatic and cyclic ketones. Acetone is a preferred saturated aliphatic ketone for use in accordance with the present invention. Other ketones include methylethylketone, methylpropylketone, methylbutylketone, methylamylketone, diethylketone, ethylpropylketone, ethylbutylketone, ethylamylketone, dipropylketone, propylbutylketone, propylamylketone, dibutylketone, etc. When desired, higher boiling ketones may be employed, including butylamylketone, diamylketone, amylhexylketone, amylheptylketone, dihexylketone, diheptylketone, etc.

Of the unsaturated aliphatic ketones, phorone is particularly preferred and, in fact, it has been found that the products formed by the condensation of phorone and hydroxyhydroquinone are substantially the same as those produced from acetone and the same polyhydroxy benzene. Other unsaturated ketones which may be used include mesityl oxide, methylheptenone, etc., but not necessarily with equivalent results.

Saturated cyclic ketones include cyclopentanone, cyclohexanone, cycloheptanone, 3-methyl-cyclohexanone, 4-methyl-cyclohexanone, etc., while unsaturated ketones include pulegone, carvone, etc.

A particular advantage to the use of hydroxyhydroquinone is the fact that it may be condensed with higher molecular weight ketones including, for example, cyclohexanone, methylamylketone, etc., and the resulting hydroxyspirochroman is of greater solubility in many substrates and particularly hydrocarbons. This increased solubility permits more ready use of the inhibitor and eliminates the need for a solvent.

It is understood that the various hydroxyspirochromans which may be prepared and utilized in accordance with the present invention are not necessarily equivalent. Furthermore, the hydroxyspirochroman compounds may be of different effectiveness in different substrates. In any event, all of the hydroxyspirochromans of the present invention will serve to retard oxidative deterioration of organic materials.

The condensation of hydroquinone or hydroxyhydroquinone or their acetates and a ketone may be effected in any suitable manner which, in general, will comprise mixing hydroquinone or hydroxyhydroquinone and a ketone with acetic acid and concentrated hydrochloric acid, followed by heating for a sufficient time to effect the reaction, after which the products may be cooled, filtered, washed to remove unreacted compounds, and then dried and purified by recrystallization.

As hereinbefore set forth the hydroxyspirochromans of the present invention may be prepared in any suitable manner. In another method, hydroxyspirochromans may be formed by the reaction of acetone, o-alkylhydroquinones with a free ortho position, and sulfuric acid at 25° C.